No. 874,324.  
PATENTED DEC. 17, 1907.

E. GERBERT.

MEANS FOR ATTACHING TIRES TO VEHICLE WHEELS.

APPLICATION FILED JAN. 22, 1907.

Witnesses:

Inventor  
Emil Gerbert  
By James L. Norris  
Atty

UNITED STATES PATENT OFFICE.

EMIL GERBERT, OF WALTERSHAUSEN, GERMANY.

MEANS FOR ATTACHING TIRES TO VEHICLE-WHEELS.

No. 874,324.

Specification of Letters Patent.

Patented Dec. 17, 1907.

Application filed January 22, 1907. Serial No. 353,554.

*To all whom it may concern:*

Be it known that I, EMIL GERBERT, a subject of the German Emperor, residing at Waltershausen, Duchy of Saxe-Coburg-Gotha, German Empire, have invented certain new and useful Improvements in Means for Attaching Tires to Vehicle-Wheels, of which the following is a specification.

This invention relates to means for attaching tires to vehicle-wheels.

The method of attaching metal rims with india-rubber tires vulcanized thereon to the fellies of carriage or cart-wheels by pressure, splines or wedges has the disadvantage that the tires are not firmly secured and therefore soon begin to slip or creep on the fellies. The tires are thus subjected to considerable damage and soon become worn out. This disadvantage is obviated by the present invention which consists in providing at one side of the metal rim a number of projections adapted to engage corresponding recesses provided in a flange arranged on the felly adjacent the rubber tire, axial displacement of the latter being prevented by the said flange on one side and by a ring screwed to the felly on the other side.

The invention is illustrated in the annexed drawing by means of an example in connection with a solid india-rubber tire attached by vulcanization to a metal rim.

Figure 1:
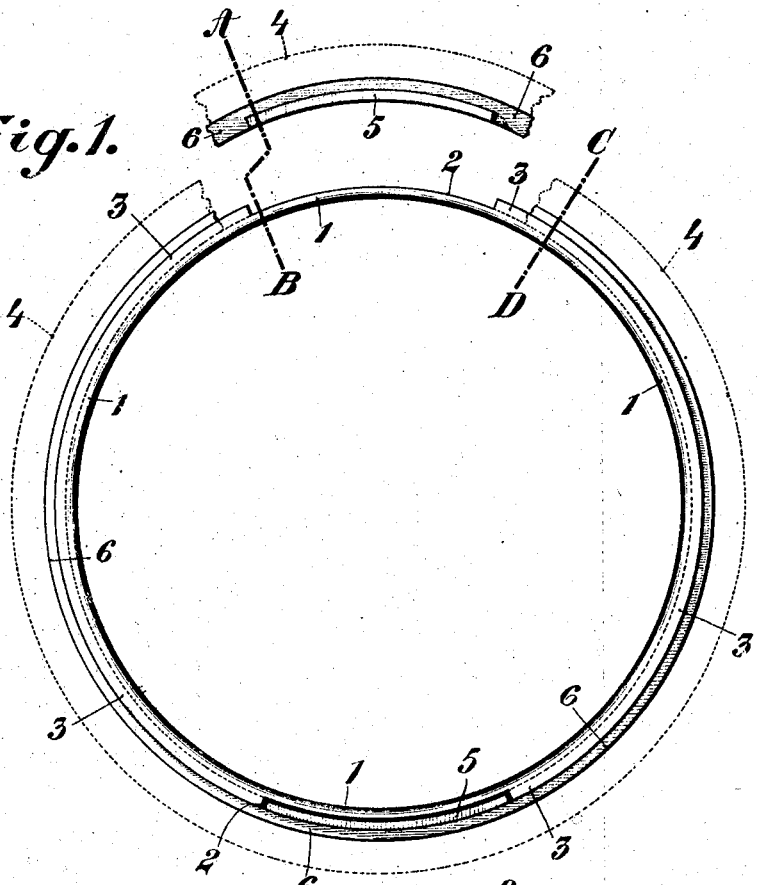
Figure 2:
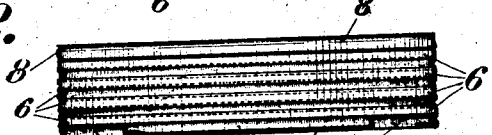
Figure 3:
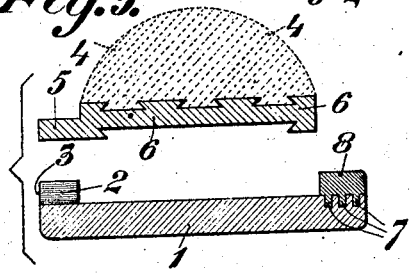
Figure 4:
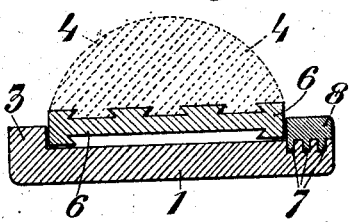

Figure 1 is a side-view, in which a portion of the tire and rim are shown detached. Fig. 2 is a partial plan-view and Figs. 3 and 4 are cross-sections on the lines A—B and C—D of Fig. 1 respectively.

The felly 1 is provided with the flange 3 having recesses 2, and the tire 4 and metal rim 6 are so placed on the felly that the projections 5 of said rim enter the recesses 2 and thus prevent creeping of the tire on the felly.

Axial displacement of the tire and metal rim on the felly is prevented by the ring 8 screwed to the felly at 7, the screw-threads used being preferably square.

For so-called twin-tires mounted on a double-felly, the flange 3 is preferably located between the tires, with the metal rims of the latter engaging alternate recesses in the flange.

What I claim as my invention and desire to secure by Letters Patent of the United States is:—

1. In a vehicle wheel having a felly, a circumferential flange on said felly and having spaced recesses, a rim carried by the felly and having lateral projections at one edge for engagement in the recesses, a tire supported by the rim, and screw threaded means for engagement with the felly on the side opposite the flange for maintaining the rim in position against lateral displacement on said felly.

2. In combination with a vehicle wheel having a felly, of a flange having spaced recesses circumferentially arranged, on said felly at one edge thereof, said felly provided with screw threads at the opposite edge, a rim for supporting a tire mounted on said felly and having edge projections at one side for engagement in the recesses, and a screw threaded member for engagement with the screw threads in the felly to lock said rim against lateral displacement on said felly.

In testimony whereof I have hereunto set my hand in presence of two subscribing witnesses.

EMIL GERBERT.

Witnesses:
OTTO KRAUSE,
JEAN GRUND.